United States Patent [19]

Curran

[11] Patent Number: 4,611,685
[45] Date of Patent: Sep. 16, 1986

[54] ACOUSTIC LOGGING IN LOW VELOCITY FORMATIONS

[75] Inventor: John W. Curran, Houston, Tex.

[73] Assignee: Exxon Production Research Co., Houston, Tex.

[21] Appl. No.: 618,029

[22] Filed: Jun. 7, 1984

[51] Int. Cl.$^4$ .............................. G01V 1/40; G01V 1/00
[52] U.S. Cl. ...................................... 181/102; 367/32; 367/36
[58] Field of Search ............... 181/102, 104, 105, 106, 181/110, 111, 115, 118; 367/25, 27, 28, 30, 32, 34, 35, 36, 142, 144, 911, 912, 23, 57

[56] References Cited

U.S. PATENT DOCUMENTS

| | | | |
|---|---|---|---|
| 2,310,559 | 2/1943 | Walker | 367/912 X |
| 2,635,705 | 4/1953 | Haggerty | 367/36 |
| 2,771,960 | 11/1956 | Smith | 367/911 |
| 3,054,471 | 9/1962 | Knudsen | 367/25 |
| 3,126,976 | 3/1964 | Cordell et al. | 367/25 X |
| 4,038,631 | 7/1977 | Murphy | 367/144 X |

FOREIGN PATENT DOCUMENTS

| | | | |
|---|---|---|---|
| 0603933 | 4/1978 | U.S.S.R. | 367/32 |
| 0717686 | 2/1980 | U.S.S.R. | 367/26 |
| 0966634 | 10/1982 | U.S.S.R. | 367/36 |

OTHER PUBLICATIONS

Silberman, E., "Sound Velocity and Attenuation in Bubbly Mixtures Measured in Standing Wave Tubes", Journal Acoustic Soc. 29, (1957), pp. 925-933.

Primary Examiner—Charles T. Jordan
Assistant Examiner—Brian S. Steinberger

[57] ABSTRACT

Acoustic logging of low velocity formations is made possible by the introduction of gas bubbles in the liquid in a borehole where logging equipment is present. Acoustic logging cannot be performed where the compressional wave velocity in the borehole liquid exceeds the compressional wave velocity in the formation to be logged because in such case, the acoustic compressional waves do not refract in the formation. The gas bubbles are introduced to lower the compressibility of the borehole liquid, resulting in a decreased velocity in the liquid so that refraction of the compressional waves can take place, making acoustic logging feasible.

17 Claims, 4 Drawing Figures

ACOUSTIC LOGGING IN LOW VELOCITY FORMATIONS

FIELD OF THE INVENTION

The invention relates to a method and apparatus for logging the acoustic wave velocity in an earth formation surrounding a borehole containing liquid where the acoustic wave velocity in the formation is less than the acoustic wave velocity in the borehole liquid.

BACKGROUND

Acoustic well logging is a generally accepted method for obtaining information about subterranean earth formations surrounding wells or boreholes. Acoustic well logging can be used in the determination of formation lithology, density, porosity, the conversion of seismic time sections to depth sections, and the detection of fractures.

A conventional acoustic logging system includes a logging sonde suspended in the borehole liquid, a source attached to the sonde for generating compressional waves ("P-waves"), and two or more receivers attached to the sonde and spaced apart from the P-wave source for detecting P-waves in the borehole liquid. A P-wave in the borehole liquid generated by the source is refracted in the earth formation surrounding the borehole. The refracted wave propagates through a portion of the formation, is refracted back into the borehole liquid, and detected by two or more receivers spaced vertically apart from each other and from the P-wave source. The first arrival will be the P-wave which refracts along the borehole wall. The ratio of the separation between the two receivers to the time difference between the detections of the refracted P-wave by the two receivers yields the P-wave velocity in the formation. From this information, many characteristics of the formation can be determined.

Conventional acoustic logging is dependent on the respective velocities of the P-waves in the borehole liquid ("liquid velocity") and in the surrounding earth formation ("formation velocity"). Refraction necessary to facilitate acoustic well logging will not occur if the liquid velocity exceeds the formation velocity. The wave will not appropriately refract in the formation so that signals can be detected. Formation velocity is often less than liquid velocity in the top levels of a formation. For this reason, conventional acoustic logging cannot be performed in many formations in the first few hundred feet below the surface.

While acoustic well logging is a widespread method of collecting data, no conventional methods permit acoustic logging in formations where liquid velocity exceeds formation velocity ("low velocity formation"). All conventional acoustic logging methods require a formation velocity that is higher than the liquid velocity. The present invention is a method and apparatus for solving this problem.

SUMMARY OF THE INVENTION

According to this invention, gas bubbles are introduced into a zone of liquid around a logging device positioned in a borehole contemporaneously with the generation of compressional acoustic waves by an acoustic source in the logging device. The presence of bubbles in the zone of liquid reduces the compressional wave velocity therein so that it is less than the compressional wave velocity in the earth formation surrounding the borehole. Refraction can then occur in a manner facilitating acoustic logging of the formation.

A preferred apparatus for practicing the invention includes a gas injector ring which has perforations spaced substantially equidistantly on its outer edge. Compressed gas is delivered to the gas injector ring by a tube connected to a compressed gas source. Gas bubbles are then introduced through the perforations in the gas injector ring into the zone of liquid in which compressional waves are generated.

DESCRIPTION OF THE PREFERRED EMBODIMENTS

The method and apparatus of the invention facilitates logging of the acoustic velocity of P-waves in an earth formation when the compressional wave velocity in the formation is less than the compressional wave velocity in the borehole liquid in which the compressional wave is generated.

Figure 1:
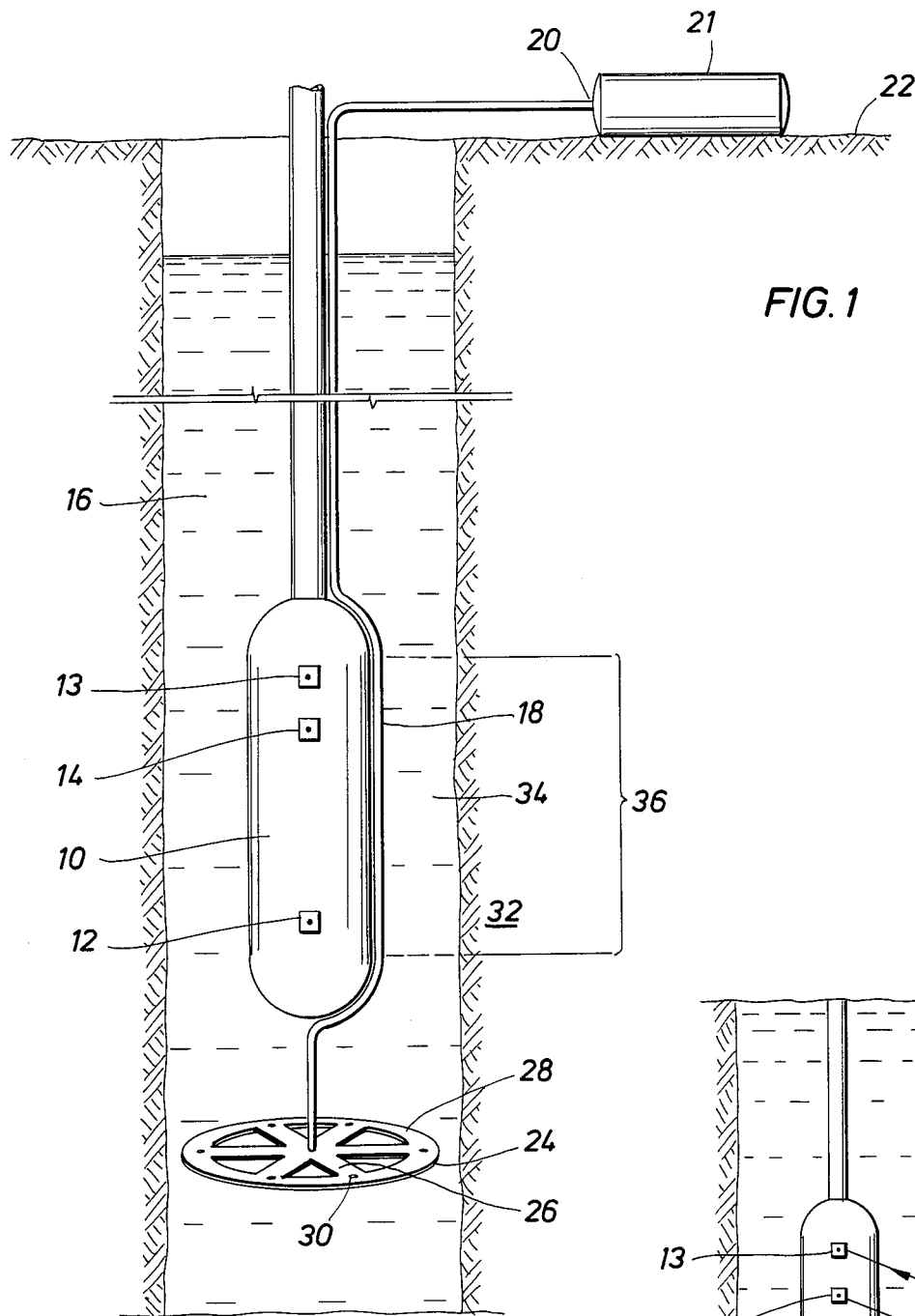
FIG. 1 is a front elevational view of a logging tool in a borehole having attached to it an acoustic source, two receivers, and a gas injector ring connected to gas compression means.

The preferred embodiment of the invention may be more easily understood with reference to FIG. 1. A conventional logging sonde 10, with attached acoustic source 12 and two receivers 13 and 14 is placed in borehole 16. Receivers 13 and 14 may be of identical construction and hence interchangeable. One end of tube 18 is attached at location 20 to compressed gas source 21 located on surface 22 above borehole 16. The other end of tube 18 is attached to gas injector ring 24 located below sonde 10. Gas injector ring 24 includes at least one hollow spoke such as spoke 26, and hollow outer edge 28. At least one perforation such as perforation 30 on outer edge 28 permits gas to escape from the interior of the ring into borehole liquid 34 in zone 36 of borehole 16 adjacent to sonde 10. If two or more perforations are used, they should be spaced substantially equidistant from each other. Although six spokes and six perforations are illustrated, more or less than six spokes or perforations may be used.

Figure 2:
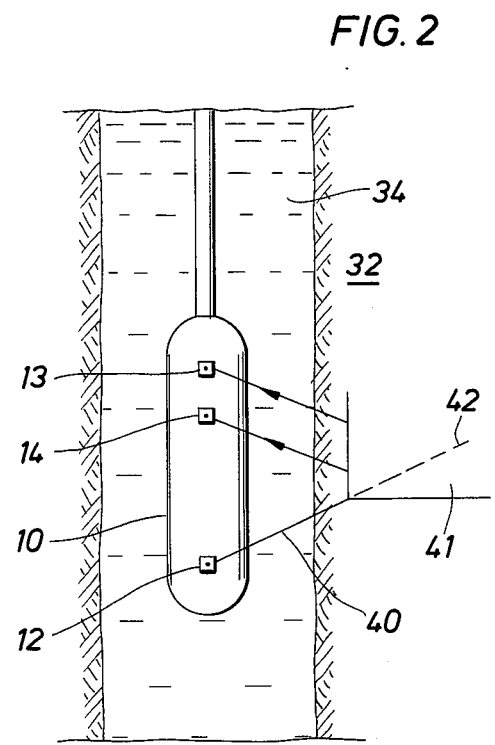
FIG. 2 is a schematic diagram of the path taken by a P-wave which refracts upon entering a formation surrounding a borehole where the velocity of the P-wave in the formation is greater than its velocity in the borehole liquid.

In order for acoustic logging to succeed, P-waves must refract upon entering formation 32. This will occur if the formation velocity exceeds the velocity in liquid 34 in zone 36. To initiate logging, P-waves produced by source 12 travel through liquid 34 in zone 36 of borehole 16. The P-waves then enter formation 32 and refract so as to reenter borehole liquid 34 and arrive at receivers 13 and 14 if the formation velocity is greater than the liquid velocity. FIG. 2 is a schematic diagram of the path taken by the portion 40 of an acoustic wave which is traveling along critical angle 41. This portion 40 travels along the wall of formation 32 and is detected by receivers 14 and 13 respectively before any other wave. The difference in travel time between source 12 and receiver 13 and source 12 and receiver 14 permits determination of the formation velocity, which in turn is used to determine porosity and other properties of the formation. Critical angle 41 is determined by the known formula $\theta c = \sin^{-1}\{V_l/V_f\}$ where $V_l$ is the compressional wave velocity in the borehole liquid, and $V_f$ is the compressional wave velocity in the formation. If the formation velocity is less than the the liquid velocity, this equation has no solution, and the refractions sought to be detected by receivers 13 and 14 do not occur.

Low formation velocity near the surface of the earth is generally caused by a low degree of consolidation. As the depth increases, the formation is compacted by pressure from sections of the formation above, increasing the consolidation. The actual depth at which the formation velocity exceeds liquid velocity depends primarily on the composition of the formation. Further, pressure inversion pockets may exist at depths where formation velocity would be expected to be greater than liquid velocity.

Figure 3:
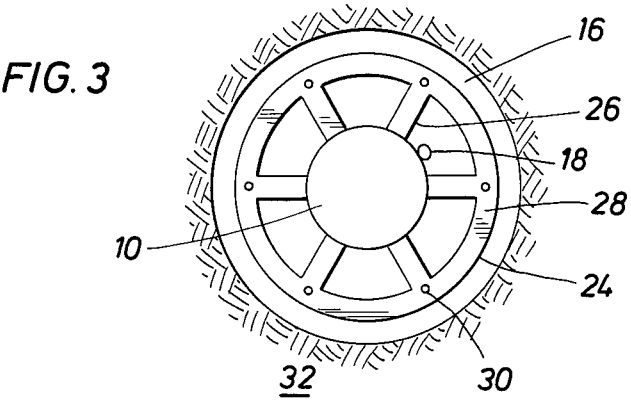
FIG. 3 is a top elevational view of a gas injector ring.

The invention permits logging in situations such as these where logging previously was not possible. Tube 18 carries gas from compressed gas source 21 to injector ring 24. FIG. 3 is a top elevational view of the preferred embodiment, which shows more clearly injector ring 24. After entering gas injector ring 24, gas is routed through spokes such as spoke 26 to outer ring 28. Gas escapes into borehole liquid 34 through perforations such as perforation 30, producing a substantially uniform distribution of bubbles which rise into zone 36. The gas bubbles lower the acoustic velocity of P-waves in bubble filled zone 36 of borehole liquid 34 so that it is less than the velocity in formation 32. The velocity of waves through a liquid is inversely proportional to the compressibility of the liquid. Since gas bubbles are extremely compressible in comparison to liquids, the presence of gas bubbles in a liquid will reduce the acoustic velocity therein. For example, E. Silberman, in "Sound Velocity and Attenuation in Bubbly Mixtures Measured in Standing Wave Tubes," Journal of the Acoustic Society of America, 29, pp. 925-933 (1957) ("Silberman"), reported that a 0.3% mixture by volume of air bubbles in water at a pressure of 109 kiloPascals and a temperature of 26.7° C. reduced the liquid velocity from 1490 m/sec to 328 m/sec. This reduction would allow acoustic logging to be conducted in many loose sands and clays where velocities between 350 m/sec and 1050 m/sec are commonly found. If the formation velocity is greater than the reduced liquid velocity, the P-waves propagating from source 12 through zone 36 can refract upon entering formation 32, so as to permit acoustic logging.

Acoustic velocity is also inversely proportional to the density of the liquid, but the effect on liquid velocity due to the density change of the liquid caused by injection of gas bubbles therein is overshadowed by the magnitude of change in liquid velocity due to the compressibility change. The density of the liquid decreases slightly by comparison. Most types of gas are suitable for use in practicing the invention since most gases have a high compressibility compared to water.

Bubble diameter must also be controlled to prevent excessive attenuation of the logging signal. According to Silberman, the surface of each bubble will resonate at a frequency determined by the following formula:

$$F_R = 1/\pi D \{3\mu Y P_o/\rho\}^{\frac{1}{2}}$$

Where
Po is the pressure at the bubble zone
$\rho$ is the density of the water gas mixture
$\mu$ is known as the Polytropic factor
Y is the adiabatic constant, and
D is the diameter of the bubble.

The average resonant frequency of the bubbles must be greater than the logging frequency. If the average resonant frequency is near the frequency of the P-waves, the energy from the P-waves is used by bubbles in their resonance, causing attenuation of the logging signal. This attenuation may be so great that the signal will not be detected by the receivers, and logging fails.

Logging typically is performed at frequencies of 10–15 kHz to ensure refractions resulting in detectable refracted signals. A bubble resonant frequency of approximately 20 kHz will allow a sufficient margin of error so that excessive attenuation will not occur. Changing the bubble diameter is the most effective method of controlling the bubble resonant frequency. Pressure will increase by approximately 10 kiloPascals (kPa) for every meter of depth in the liquid. The density of the liquid-gas mixture will be determined by the volume of bubbles distributed. If these values are known, a desired bubble diameter can be determined.

The following example shows how bubble diameter can be adapted to yield the desired bubble resonant frequency. Using the resonant frequency formula, the minimum resonant frequency can be found when $\mu = 1/Y$. The equation is reduced to:

$$F_R = 1/\pi D \{3P_o/\rho\}^{\frac{1}{2}}$$

In this example the logging will be attempted at a depth of 17 meters. The pressure at this depth will be approximately 170 kPa. It will be assumed that the borehole liquid will have a density of approximately 1000 kg/m$^3$. The density will change as gas bubbles are introduced into the borehole liquid, but the volume of gas bubbles used makes this change insignificant. Where these pressure and density conditions exist, a bubble diameter of 0.1 mm will have a resonant frequency of 20 kHz. Since the pressure and bubble diameter are inversely proportional to each other it is preferred that when logging a borehole according to the invention, the perforations be continuously adjusted so that the bubbles formed have an average diameter giving a preferred average resonant frequency at each depth logging is conducted.

Figure 4:
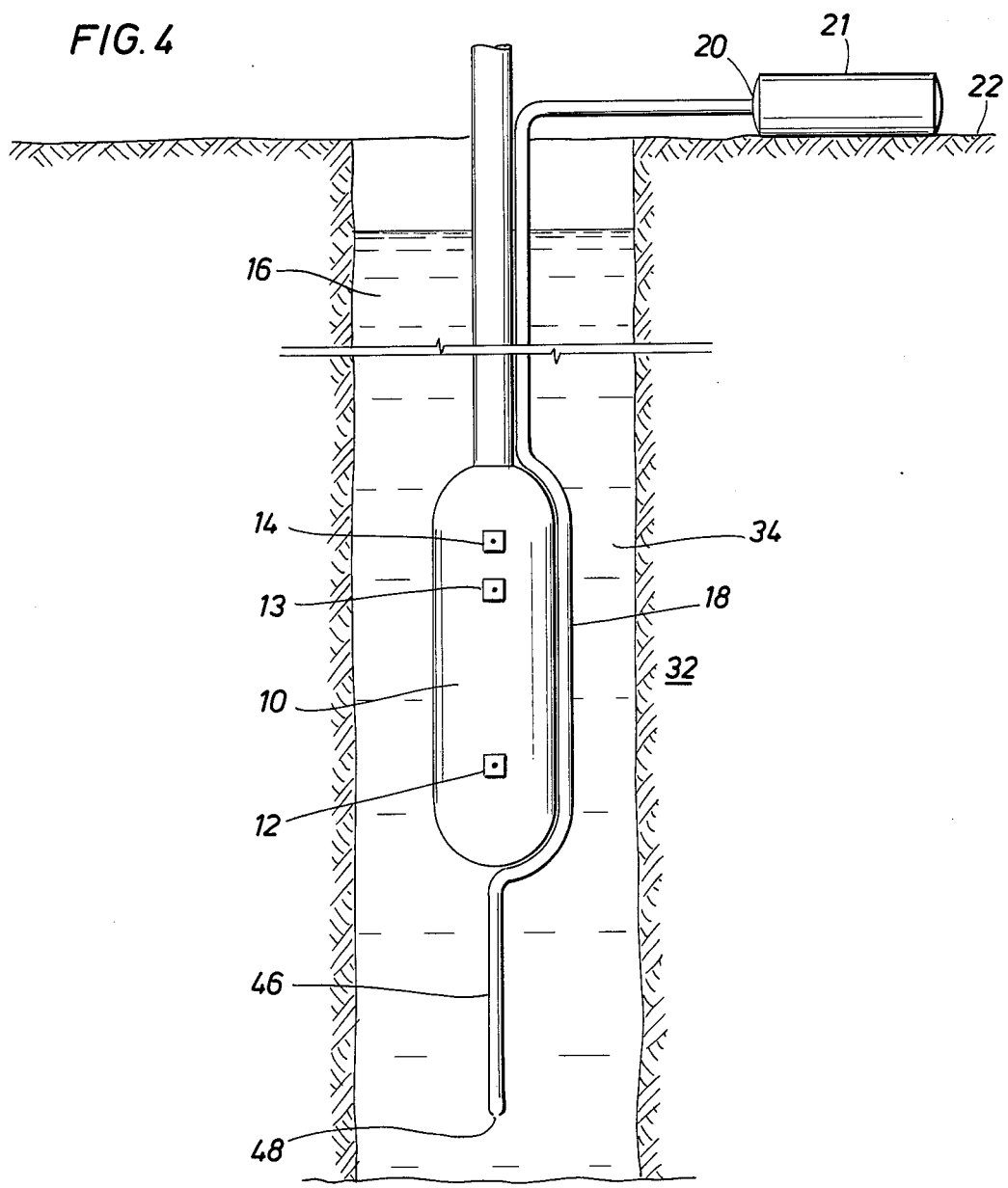
FIG. 4 is a front elevational view of a logging tool in a borehole having attached to it an acoustic source, two receivers, and a single injector hole located at the end of a tube connected to gas compression means.

Other constructions of the apparatus are envisioned. FIG. 4 shows a single injector hole 48 located at the tip of tube 46 through which bubbles may be introduced from compressed gas source 21 into borehole liquid 34. Bubbles may alternatively be injected from injector holes positioned at various points near sonde 10.

The above description is merely illustrative of the present invention. Various changes in shapes, sizes, materials or other details of method and construction may be within the scope of the appended claims without departing from the spirit of the invention.

What is claimed is:

1. A method for acoustically logging an earth formation surrounding a borehole which contains a liquid, said method comprising the steps of:

generating P-waves having a predetermined frequency at a first location in the borehole in a manner so that the wave will propagate through a zone in said liquid and then penetrate the formation and be refracted in the formation;

contemporaneously introducing gas bubbles into the liquid zone so as to lower the P-waves velocity in the liquid zone to a value less than the P-wave velocity in said formation, wherein the average resonant frequency of said gas bubbles is selected to be greater than said predetermined frequency, and wherein said average resonant frequency is adjusted by varying the average diameter of said bubbles according to the following equation:

$$F_R = 1/\pi D\{3\mu Y P_o/\rho\}^{\frac{1}{2}}$$

where
$F_R$ is the average resonant frequency of the bubbles;
D is the average diameter of the bubbles;
Po is the pressure at the bubbles;
$\rho$ is the density of the water gas mixture;
$\mu$ is the Polytropic factor; and
Y is the adiabatic constant; and detecting the arrival of the refracted P-waves at at least one receiver spaced vertically from the first location.

2. The method of claim 1 wherein said gas bubbles are introduced into the liquid zone from a source located below the zone.

3. The method of claim 1 wherein the gas bubbles are introduced through a single gas injector hole.

4. A method for acoustically logging an eacrth formation surrounding a borehole having an axis and containing a liquid, said liquid having a determined average compressibility, said method comprising the steps of:

suspending a logging device, having attached to it an acoustic source and one or more receivers vertically spaced from: each other, in said liquid along the axis of said borehole;

generating with said source P-waves having a predetermined frequency which will propagate through a zone in said liquid and then penetrate and refract in said formation;

simultaneously introducing gas bubbles into the liquid zone at two or more points spaced radially around the borehole axis and below said source so as to increase the average compressibility of the liquid in the liquid zone sufficiently to lower the P-wave velocity in the liquid zone to a value less than the P-wave velocity in said formation, wherein the average resonant frequency of said gas bubbles is greater than said predetermined frequency, and wherein said average resonant frequency is adjusted by varying the average diameter of said bubbles according to the following equation:

$$F_R = 1/\pi D\{3\mu Y P_o/\rho\}^{\frac{1}{2}}$$

where
$F_R$ is the average resonant frequency of the bubbles;
D is the average diameter of the bubbles;
Po is the pressure at the bubbles;
$\rho$ is the density of the water gas mixture;
$\mu$ is the Polytropic factor; and
Y is the adiabatic constant; and detecting the arrival of the refracted P-waves with said receivers.

5. The method of claim 4 wherein the gas bubbles are introduced through a gas injector ring, said ring having at least one hollow spoke, a hollow outer edge, and at least one perforation on said outer edge through which gas bubbles may escape into the liquid.

6. The method of claim 5 wherein two or more perforations are spaced substantially evenly from each other on said outer edge.

7. The method of claim 5 wherein said injector ring is located directly below the logging device.

8. The method of claim 5 wherein said injector ring is attached by a hollow tube to a compressed gas source on the ground above the borehole, said hollow tube having a first open end attached to said gas compression source and a second open end attached to said injector ring.

9. The method of claim 4 wherein a hollow tube is attached to the logging sonde, said tube having a first open end through which gas bubbles are introduced into the liquid zone, and a second open end attached to said compressed gas source.

10. Apparatus for acoustically logging an earth formation surrounding a borehole which contains a liquid, said apparatus, comprising:

a logging sonde;

an acoustic source attached to said logging sonde, and capable of generating P-waves having a predetermined frequency at a first location in the borehole so that said P-waves will propagate through a zone in said liquid and then penetrate the formation and be refracted in the formation;

means attached to the logging sonde for introducing gas bubbles into the liquid zone so as to lower the P-wave velocity in the liquid zone to a value less than the P-wave velocity in said formation, wherein the average resonant frequency of said bubbles is selected to be greater than said predetermined frequency, and wherein the average diameter of the bubbles is determined by the following equation:

$$F_R = 1/\pi D\{3\mu Y P_o/\rho\}^{\frac{1}{2}}$$

where
$F_R$ is the average resonant frequency of the bubbles;
D is the average diameter of the bubbles;
Po is the pressure at the bubbles;
$\rho$ is the density of the water gas mixtures;
$\mu$ is the Polytropic factor; and
Y is the adiabatic constant; and at least one receiver attached to the logging sonde, said rceivers being capable of detecting the arrival of the refracted P-waves.

11. The apparatus of claim 10 wherein said gas bubbles introducing means is attached so as to be located below the first location when the apparatus is positioned in the borehole.

12. Apparatus for acoustically logging an earth formation surrounding a borehole having an axis and containing a liquid, said apparatus comprising:

a logging sonde;

an acoustic source attached to said logging sonde, and capable of generating P-waves having a predetermined frequency at a first location in theborehole so that said P-waves will propagate through a zone in said liquid and then penetrate the formation and be refracted in the formation;

a hollow tube attached to the logging sonde and having a first open end and a second open end;

a compressed gas source attached to said second open end;

a gas injector ring attached to said second open end, said ring having at least one spoke extending from said tube, an outer edge, and a plurality of perforations on said outer edge, said perforations capable of introducing gas bubbles into said liquid zone having an average resonant frequency selected to be greater than said predetermined frequency, so as to lower the P-wave velocity in the liquid zone to a valve less than the P-wave velocity in said formation, wherein the average diameter of the bubbles is determined by the following equation:

$$F_R = 1/\pi D\{3\mu Y P_o/\rho\}^{\frac{1}{2}}$$

where $F_R$ is the average resonant frequency of the bubbles;

D is the average diameter of the bubbles.

Po is the pressure at the bubbles;

$\rho$ is the density of the water gas mixture;

$\mu$ is the Polytropic factor; and

Y is the adiabatic constant; and at least one receiver attached to the logging sonde and spaced vertically along said logging sonde from said acoustic source for detecting the arrival of the refracted P-waves.

13. The apparatus of claim 12 wherein two or more perforations are spaced substantially evenly from each other on said outer edge.

14. The apparatus of claim 12 wherein the mean diameter of the perforations is such that the gas bubbles introduced into the liquid through the perforations have an average resonant frequency greater than said predetermined frequency of the P-waves.

15. The apparatus of claim 12 wherein said injector ring is located below the first location when the apparatus is positioned in the borehole.

16. Apparatus for acoustically logging an earth formation surrounding a borehole having an axis and containing a liquid, said apparatus comprising:

a logging sonde, an acoustic source attached to said logging sonde and capable of generating P-waves having a predetermined frequency at a first location in the borehole so that said P-wave will propagate through a zone in said liquid and then penetrate the formation and be refracted in the formation;

a hollow tube attached to the logging sonde and having a first open end with a single injector hole located at said first open end, said injector hole capable of introducing gas bubbles into said liquid zone having an average resonant frequency selected to be greater than said predetermined frequency, so as to lower the P-wave velocity in the liquid zone to a value less than the P-wave velocity in said formation, wherein the average diameter of the bubbles is determined by the following equation:

$$F_R = 1/\pi D\{3\mu Y P_o/\rho\}^{\frac{1}{2}}$$

where $F_R$ is the average resonant frequency of the bubbles;

D is the average diameter of the bubbles;

Po is the pressure at the bubbles;

$\rho$ is the density of the water gas mixture;

$\mu$ is the Polytropic factor; and

Y is the adiabatic constant; and at least one receiver attached to the logging sonde and spaced vertically along said logging sonde from said acoustic source for detecting the arrival of the refracted P-waves.

17. The apparatus of claim 16 wherein said injector hole is located below the first location when the apparatus is positioned in the borehole.

* * * * *